Patented Dec. 26, 1950

2,535,990

UNITED STATES PATENT OFFICE 2,535,990

PRODUCTION OF SODIUM NITRATE

Leonard A. Stengel, Terre Haute, Ind., assignor to Commercial Solvents Corporation, Terre Haute, Ind., a corporation of Maryland No Drawing. Application June 4, 1947, Serial No. 752,567

10 Claims. (Cl. 23—102)

My invention relates to the production of sodium nitrate, and more particularly to a process for producing sodium nitrate by contacting sodium carbonate or bicarbonate, with nitrating agents at elevated temperatures.

The problem of the production of alkali metal nitrates has occupied the attention of chemists over a long period of time. The processes resulting from previous research on this problem can be divided into three classes. The first is the exchange of the nitrate ion from an aqueous solution of a nitrate for the negative ion of an alkali metal salt. The second method involves the treatment of an alkali metal salt in aqueous solution with nitric acid. The third class includes the treatment of solid alkali metal salts with various nitrating agents such as nitric acid vapors or the various oxides of nitrogen.

The first two methods are inadequate because they require fractional crystallization, which in general is a tedious and expensive operation. The third method is undesirable because of the long periods of time necessary to produce complete conversion of the alkali metal salts into the nitrate.

I have now discovered that the nitration of sodium carbonate and bicarbonate proceeds very rapidly if the said materials are treated with nitrating agents at a temperature at or above the melting point of the corresponding nitrate. Under such reaction conditions the resulting sodium nitrate can be removed from the reactor in a molten condition, thus providing a process that is extremely convenient in application and at the same time adaptable to continuous operation.

As the reactor for my process I prefer to use a vertical or inclined column of such design that a constant high temperature between 100° and 600° C. can be maintained. This reactor column preferably contains a perforated plate at the base which supports the solid sodium carbonate or bicarbonate in the form of solid chips, crystals, cakes, or other available form, and suitable means for heating the reactor which may, for example, be a jacket surrounding the reactor which can be filled with a heating medium such as diphenyl ether and diphenyl or mixtures thereof, or a mixture of liquefied salts; or the jacket may be dispensed with and heating effected by a spiral heating element around the column. Such arrangement permits the heat of neutralization to be fully utilized. The principle of counter-current flow is used in my process; that is, the solid to be converted into the nitrate may be continuously introduced at the top of the reactor and the nitrating agent such as nitric acid vapors passed continuously upwards from below the perforated plate which supports the solid. Or, the solid may be continuously fed into the reactor at the top together with the nitric acid in liquid or vapor form and both passed through the reactor. The molten nitrate is drawn off continuously from the base of the reactor through a liquid seal. If a slight vacuum is maintained in the reactor by means of a steam jet or other suitable means the molten product can flow directly from the bottom of the reactor and the fluid seal may be eliminated. The molten nitrate thus obtained is then in a form suitable for beading, prilling, or flaking as may be desired. The gases produced in the reaction, such as carbon dioxide and steam, are removed from the top of the column along with any unchanged nitric acid vapors and other oxides of nitrogen and passed through a suitable condensing chamber so that the nitric acid vapors may be condensed and recycled. From the above description, it will be seen that we prefer to maintain the reactor in a vertical position. However, it will work equally well in an inclined position.

My processes may be operated in such a manner as to produce sodium nitrate containing from as little as about 0.01 to about 5% impurities, depending on the purity of the starting material and of the weak acid, or its decomposition products.

Because of the corrosive nature of the reactants and products of my process, it is necessary to use equipment which has been thoroughly lined with acid-resistant material. Such materials include silicon carbide and metallic alloys of high silicon content. Those parts of the apparatus which are not in contact with the hot nitric acid vapors or the molten nitrate may be constructed of stainless steel such as "18—8 stainless steel" (18% chromium, 8% nickel).

It is to be distinctly understood that my invention is not limited to the types of apparatus described above, but may be carried out in any type of apparatus which would be recognized as suitable by those skilled in the art. In the application of my process, I prefer to use pure, or relatively pure, sodium carbonates. Using pure starting material obviates the necessity of removing impurities from the molten nitrates obtained in the process. Such a purification involves difficulties, but can be accomplished by such means as settling and decantation, centrifugation, or by filtration.

As a nitrating gas in my process, I have found it desirable to use vaporized nitric acid of substantially any concentration, but I prefer to use concentrated acid of about 50 to 65%. I have also found it useful to employ a mixture comprising vaporized nitric acid and nitrogen dioxide; and it has also been observed that the nitrating gases may be diluted with inert gases such as nitrogen and carbon dioxide. The presence of oxygen in the nitrating gas does not have an undesirable effect.

The temperature employed in my process should be at least as high as the melting point of sodium nitrate, for I have observed that the reaction is extremely slow at low temperatures. The maximum temperature should be below the temperature of the decomposition point of sodium nitrate. This reaction temperature is less important when very short reaction times, for example, one second or less, are maintained. I prefer, however, to operate within the lower portion of the operable temperature range in order to minimize heat losses and corrosion difficulties.

Unlike the minimum temperature which is critical in my process, the contact time is not a critical variable. Ordinarily, I prefer to operate at a contact time within the range of about $\frac{1}{10}$ second to about 3 minutes or more, calculated on the basis of the free space within the reaction zone and the actual volume of gaseous reactants under the actual operating conditions.

My process may be illustrated by the following example. The vapors from 56% nitric acid were passed up through a vertical tube reactor filled with solid sodium carbonate in the form of lumps and maintained at a reaction temperature ranging from 305–350° C. From 75 grams of $HNO_3$ (100% basis) there was obtained from the bottom of the reactor 92 grams of molten sodium nitrate which analyzed 73.31% $NO_3$ and 28.46% $Na^+$. This represented a conversion of 97–98% on the $HNO_3$ used.

In the appended claims I use the term "carbonates" in the generic sense to include both the normal and the bicarbonates.

Now having described my invention, what I claim is:

1. In a process for the manufacture of sodium nitrate from solid sodium carbonates, the step which comprises contacting a stream of a nitrating gas with a mass of a solid sodium carbonate at a temperature above the melting point of sodium nitrate, but below the temperature causing any substantial decomposition of sodium nitrate and below the melting point of the sodium carbonate, thereby forming a melt of sodium nitrate, and removing said melt from contact with the solid carbonate substantially as fast as it is formed.

2. The process of claim 1 wherein the nitrating gas comprises the vapors of nitric acid.

3. The process of claim 1 wherein the nitrating gas comprises the vapors of nitric acid having a concentration within the range of about 50 to 65 per cent by weight.

4. The process of claim 1 wherein the contact time of the nitrating gas with said sodium carbonate is within the range of from about $\frac{1}{10}$ second to three minutes.

5. The process of claim 1 wherein the mass of sodium carbonate is in the form of a column and the nitrating gas is passed upwardly through said column.

6. The process of claim 1 wherein the carbonate is sodium carbonate.

7. The process of claim 1 wherein the carbonate is sodium bicarbonate.

8. In a continuous process for the manufacture of sodium nitrate from solid sodium carbonates, the steps which comprise contacting solid particles of a solid sodium carbonate with a nitrating agent at a temperature above the melting point of sodium nitrate, but below the temperature causing any substantial decomposition of sodium nitrate and below the melting point of the sodium carbonate, thereby forming a melt of sodium nitrate which separates from the unreacted solid sodium carbonate substantially as fast as it is formed, and removing said molten sodium nitrate from the reaction zone by gravity flow.

9. The process of claim 8 wherein the sodium carbonate is fed to the reactor substantially as fast as the sodium carbonate is converted into sodium nitrate.

10. The process of claim 8 wherein the nitrating agent is liquid nitric acid which is fed continuously to the reactor.

LEONARD A. STENGEL.

REFERENCES CITED

The following references are of record in the file of this patent:

UNITED STATES PATENTS

| Number | Name | Date |
|---|---|---|
| 1,616,900 | Kassner | Feb. 8, 1927 |
| 1,798,533 | Henglein | Mar. 31, 1931 |
| 2,007,478 | Rosenstein | July 9, 1935 |